United States Patent [19]

Boaz

[11] 4,407,847

[45] Oct. 4, 1983

[54] PROCESS FOR THE MANUFACTURE OF GLASS SHEETS

[75] Inventor: Premakaran T. Boaz, Livonia, Mich.

[73] Assignee: Ford Motor Company, Dearborn, Mich.

[21] Appl. No.: 335,124

[22] Filed: Dec. 28, 1981

[51] Int. Cl.³ .......................... B05D 3/06; B05D 5/12
[52] U.S. Cl. ..................................... 427/35; 427/54.1; 427/108; 427/126.2; 427/165; 427/264; 427/266; 427/287; 427/379
[58] Field of Search ...................... 427/54.1, 108, 165, 427/163, 286, 287, 379, 389.7, 35, 126.2, 264, 266

[56] References Cited

U.S. PATENT DOCUMENTS

| | | | |
|---|---|---|---|
| 4,039,720 | 8/1977 | Cherenko et al. | 427/54.1 X |
| 4,109,044 | 8/1978 | Marriott | 427/108 X |
| 4,294,867 | 10/1981 | Boaz | 427/108 X |

Primary Examiner—Michael R. Lusignan
Attorney, Agent, or Firm—William E. Johnson; Olin B. Johnson

[57] ABSTRACT

A process is disclosed for the manufacture of glass sheets, particularly electrically heated backlites (EHB's). The process includes the steps of selecting a glass sheet and then applying an opaque band to a surface of that sheet. The opaque band is formed from a radiation curable paste which includes both a filler material which can fuse to the glass sheet when heated to a fusion temperature and a radiation curable material which is heat decomposable into components which are nonreactive with the glass sheet when heated to a fusion temperature. The radiation curable material is cured thereby to form a temporary bond of the radiation curable paste to the surface of the glass sheet. As an optional step in order to form an EHB, a pattern of electrically conductive material is deposited on the surface of the glass sheet. This conductive material contains at least one component which is heat fusable with the surface of the glass sheet when heated to the fusion temperature. The glass sheet is passed through a heating lehr which heats the various elements to the fusion temperature whereby the fusable materials are fused to the surface of the glass sheet and the radiation curable material is heat decomposed into components which are nonreactive with the surface of the glass sheet.

9 Claims, 3 Drawing Figures

PROCESS FOR THE MANUFACTURE OF GLASS SHEETS

TECHNICAL FIELD

This invention relates to a process for the manufacture of glass sheets used as windows. The invention is particularly directed to a process for the manufacture of electrically heated backlites (EHB's). The inventive process is one which is used to apply opaque bands to windows or EHB's. The opaque bands are used to provide a visual barrier to areas that might otherwise be viewable through such windows or EHB's.

BACKGROUND ART AND PRIOR ART STATEMENT

No prior art search was conducted on the subject matter of this application in U.S. Patent and Trademark Office or in any other search facility.

In vision units which are used in motor vehicles it is often necessary to provide a visual barrier along a part of the vision unit so that when the vision unit is in its installed position, one may not view areas of the motor vehicle which should not be viewed. For example, the windshields installed in modern motor vehicles extend generally down below the top of an instrument panel which is located inside the windshield. If the windshield was completely transparent in this area, one could look from the exterior of the vehicle and see the equipment mounted underneath the instrument panel. Thus a visual barrier is applied to the lower edge of the windshield in order to provide a means of blocking the path of vision into the area below the instrument panel.

In the same manner, an opaque border is provided around the rear vision unit or backlite of the motor vehicle. The border is used so that one cannot see the area below the package tray or areas behind the molding which secure the backlite in its proper position.

In the past, these visual barriers have been applied to the vision unit in question during the manufacture of that vision unit. Generally, the vision barriers have been applied in the necessary area by silk screen printing a paste of a material consisting of a fusable ceramic material and a pine oil onto the vision unit. The vision unit is then heated in a heating lehr in order to burn off the pine oil and fuse the ceramic frit to the vision unit. The ceramic frit is opaque and thus provides the vision barrier.

Since the pine oil/ceramic frit paste is still flowable after it has been applied to the vision unit, the unit must be handled very carefully while it is moved from the silk screen printing operation to any other operation. If the paste is contacted or touched, it may be smeared or wiped over the surface of the vision unit thereby ruining that unit. If the paste material is smeared or smudged along the vision unit, it is necessary to wash all of the material off that vision unit and re-process the same through the silk screen printing operation.

Since the silk screen printing operation is normally along the lower edge or around all of the edges of the vision unit, it is sometimes quite difficult to handle that vision unit with the smearable paste material thereon without, in fact, smearing that paste. Thus, there has been in the prior art substantial difficulty in manufacturing vision units with opaque screens along the edges thereof because of the fact that the paste which is used to form the opaque area is a paste material which may be smudged during the handling of the vision unit.

It is a principal object of the method of this invention to provide a method in which a paste applied to define an opaque area on a vision unit is a radiation curable paste and that paste is radiation cured prior to handling so that upon handling the same cannot be smudged.

DISCLOSURE OF THE INVENTION

This invention relates to a process for the manufacture of glass sheets and in its broadest context includes the following steps.

A glass sheet is selected. An opaque band is applied to a surface of the glass sheet. The opaque band is formed from a radiation curable paste which includes both a filler material which can fuse to the surface of the glass sheet when heated to a fusion temperature and a radiation curable material which is heat decomposable into components which are nonreactive with the glass sheet when heated to a fusion temperature. The radiation curable material is cured thereby to form a temporary bond of the radiation curable paste to the surface of the glass sheet. Thereafter, the glass sheet is passed through a heating lehr which is operated at a temperature sufficiently high to heat the glass sheet to the fusion temperature. In this manner the fusable material of the radiation curable paste is fused to the surface of the glass sheet and the radiation curable material is decomposed into components which are nonreactive with the surface of the glass sheet.

The method of this invention has particular utility for the manufacture of electrically heated backlites (EHB's). In the manufacture of such EHB's, the process is carried out as follows.

A glass sheet is selected. An opaque band is applied to a surface of the glass sheet. The opaque band is formed from a radiation curable paste which includes both a filler material which can fuse to the surface of the glass sheet when heated to a fusion temperature and a radiation curable material which is heat decomposable into components which are nonreactive with the glass sheet when heated to the fusion temperature. The radiation curable material is cured thereby to temporarily bond the radiation curable paste to the surface of the glass sheet. A pattern of electrically conductive material is deposited on the surface of the glass sheet. The pattern of electrically conductive material contains at least one component which is heat fusable with the surface of the glass sheet when the glass sheet is heated to the fusion temperature. Thereafter, the glass sheet is passed through a heating lehr which is operated at a temperature sufficiently high to heat the glass sheet to the fusion temperature. In this manner the fusable materials of the opaque band and the electrically conductive material are fused to the surface of the glass sheet. Also, the radiation curable material is heat decomposed into components which are nonreactive with the surface of the glass sheet.

The radiation curable material may be sensitive to ultraviolet light and thereby be curable by treatment by passing under a UV light source. Another form of radiation curable materials are those which respond to and are cured by electron beam radiation.

BRIEF DESCRIPTION OF THE DRAWINGS

The novel features that are considered characteristic of the invention are set forth with particularlity in the appended claims. The invention itself, however, both as to its organization and its method of operation, together with additional objects and advantages thereof, will best be understood from the following description of specific embodiments when read in connection with the accompanying drawings wherein like reference characters indicate like parts throughout the several figures, and in which:

BEST MODE AND INDUSTRIAL APPLICABILITY

The following description is what I consider to be a preferred embodiment of my method for manufacturing glass sheets and in particular glass sheets which are used as EHB's. The following description also sets forth what I now contemplate to be the best mode of carrying out the method of this invention. The description is not intended to be a limitation upon the broader principles of this method and while preferred materials are used to illustrate the method in accordance with the requirements of the patent laws, it does not mean that the method is operative only with the stated materials as others may be substituted therefor.

Also, for example, the method disclosed herein may be successfully used with materials yet to be developed by skilled artisans, such as new types of radiation curable polymers. It is therefore contemplated by me that the method disclosed herein may also be successfully used with materials which are yet to be developed because the principles of operation of the method remain the same, regardless of the particular materials used with the method.

In the preferred embodiment to be described herein, the method of manufacturing windows will be illustrated by its use in the manufacture of electrically heated backlites, hereinafter EHB's.

EHB's are becoming a widely selected option for motor vehicles. The EHB's form the rear vision unit of the vehicle and are so constructed that an electrical current may be passed through a grid pattern on the vision unit for the purpose of defogging or deicing that vision unit. The grid pattern is generally formed from a silver ceramic material which is fused onto the surface of a glass sheet in a heating operation. The silver ceramic material is initially applied to the glass sheet in a silk screen printing operation. When initially applied, the grid pattern is in a delicate condition in that though formed of a highly viscous material it is still in a flowable or displaceable condition and it can be smudged or smeared over the surface of the glass sheet if something comes into contact therewith. It is necessary to heat the grid pattern to an elevated temperature in order for the fusable components of that grid pattern to fuse to the glass sheet.

Figure 1:
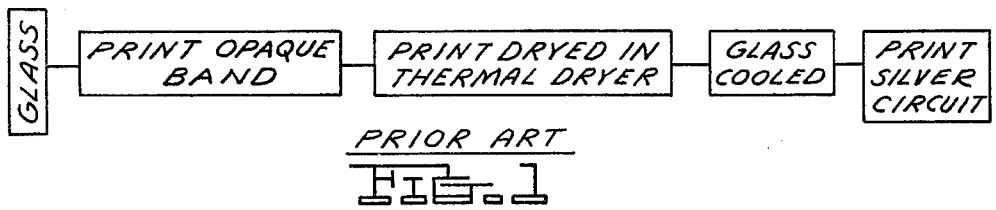
FIG. 1 is a flow diagram of some of the steps of the method of the prior art for manufacturing an EHB with an opaque band therearound.

In FIG. 1 there is a flow diagram of a known prior art process for making EHB's. In this process a glass sheet is initially selected. An opaque band is printed on the glass sheet in the area that a vision barrier is required. The opaque band is formed from a ceramic frit material contained in pine oil. The ceramic frit is an opaque material formed from a low melt, lead oxide containing glass.

After the printing operation the glass and band are subjected to a thermal drying operation in which some of the components of the pine oil are vaporized. This provides a temporary bonding of the opaque band to the glass sheet. After the drying operation the glass sheet is allowed to cool to room temperature. Once the glass is cooled to room temperature, the EHB circuit pattern is printed thereon and further manufacturing steps are carried out to complete the EHB.

The particular thing to notice about the prior art process is that there is a step necessary of heating the printed opaque band to obtain a temporary cure of the material so that the EHB pattern may be printed on the glass without smudging or smearing the opaque band. It is also necessary, after the heating of the glass sheet to cure the opaque band, to permit that glass sheet to cool once again to room temperature before the EHB is printed thereon. Thus there is a requirement for heating and cooling the glass sheet, which costs money, and for handling that sheet during the heating and cooling operations. All of the heating and cooling and handling steps associated therewith are eliminated by the method of my invention. This fact will be seen hereinbelow.

The method of my invention will be illustrated in its preferred embodiment by the manufacture of EHB's. However, the method may also be applied to the manufacture of windows, in which case no electrically conductive grid pattern is printed on the glass sheet, merely the opaque band.

Figure 2:
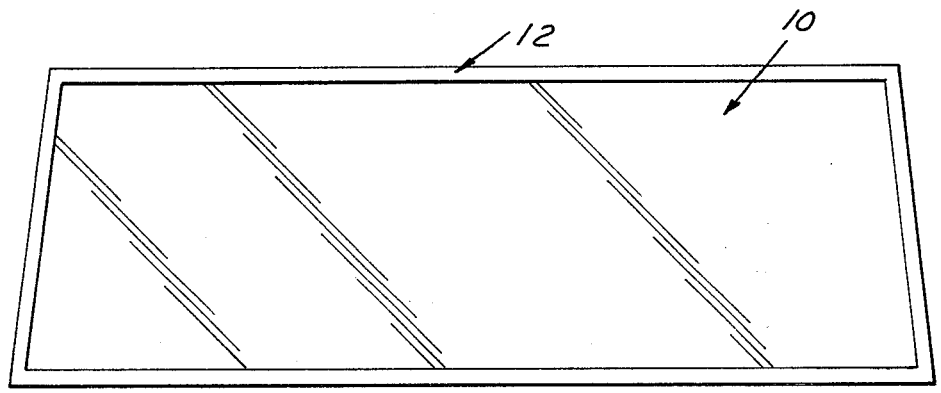
FIG. 2 is a schematic representation of a glass sheet having an opaque band printed thereon in accordance with the teachings of the method of this invention.
Figure 3:
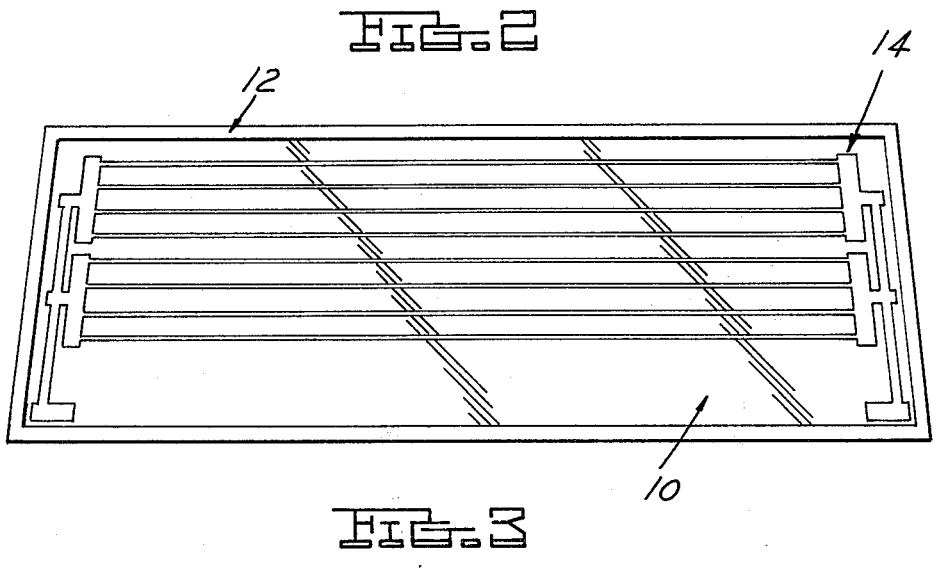
FIG. 3 is a view similar to FIG. 2, except it also shows the printing of an electrically conductive material on the surface of the glass sheet.

As best seen in FIG. 2, a glass sheet generally identified by the numeral 10 is used for forming the rear visiion unit for a motor vehicle. The glass sheet 10 may be made, for example, from float glass manufactured by the float process. In general, the glass sheet is transparent throughout its length and width. As stated previously, it is sometimes necessary to provide an opaque protion, particularly about the edges of the glass sheet, in order to provide a vision barrier so that unwanted portions of the motor vehicle are not viewed through the glass sheet.

In accordance with the teachings of the preferred method of my invention, an opaque band generally identified by the numeral 12 is applied to a surface of the glass sheet 10 in a silk screen printing operation. The opaque band is formed in accordance with the teachings of the method of my invention from a radiation curable paste which includes both a filler material and a radiation curable material. The filler material is one which can fuse to the surface of the glass sheet and form an opaque band therealong. Suitable filler materials are the same as used in the prior art, such as the low melt temperature lead oxide containing glass mentioned earlier. The radiation curable material is one which is also heat decomposable into components which are nonreactive with the glass sheet when heated to the fusion temperature. The proportions of filler material radiation curable material may lie in the range from 20/80 to 80/20, depending on the materials selected.

The principal thing about the radiation curable paste is that it contains a radiation curable material. By a radiation curable material I mean one which in response to the application of radiation, for example, radiation in the ultraviolet range, will react as, for example, by cross-linking some or all of the its unsaturated olefinic bonds thereby to produce a hardened material. The amount of filler material is controlled so that sufficient radiation curable material is always present to produce a hardened mass after the application of radiation thereto.

There are, of course, many other materials other than the olefinic unsaturated materials in which the curing thereof is induced by radiation. For example, radiation can cure materials by mechanisms such as chain extension and other mechanisms well known in the art. These other materials are included within the scope of this teaching so long as the final material produced is one which is temporarily bonded to the surface of the glass sheet 10 and will not be smudged or smeared by contact therewith of an object. Other radiation sources which may be used are sources such as electron beam radiation.

In accordance with the teachings of a preferred embodiment of the method of this invention, the radiation curable material used to make the radiation curable paste is a material which contains low melt temperature, lead oxide containing glass frit as the filler material and a radiation curable acrylic resin such as the acrylic resin material sold by Advanced Corporation of Chicago, Ill. under the name CUP 9009, these two being combined on a 75–25% by weight basis. This particular material is curable under ultraviolet radiation. The cure of the material is obtained in a very short period of time, that is, in a matter of seconds when the material is exposed to ultraviolet radiation.

The next step is that of curing the radiation curable material. This curing operation forms a temporary bond of the radiation curable paste to the surface of the glass sheet. In accordance with the teachings of the preferred embodiment, the curable material is cured by passing it under ultraviolet light. The ultraviolet light may be located in a location spaced just beyond the point at which the opaque band 12 was applied to the glass sheet 10. This curing action forms an opaque band which is temporarily bonded to the surface of the glass sheet.

To this point there has been disclosed a method of manufacturing glass sheets which may be used as windows. However, if it is desired to manufacture EHB's, it is necessary to place a circuit pattern on the glass sheet 10. Since the opaque band 12 has been temporarily bonded to the glass sheet, one may proceed to place a circuit pattern on the glass sheet without worry of smudging or smearing the opaque band 12.

In accordance with the next step of the preferred method of this invention, the glass sheet 10 has an electrical grid pattern generally identified by the numeral 14 silk screen printed thereon. The silk screen printing operation for making EHB's is well known to the skilled artisan. Basically, the electrical grid pattern is formed principally from a silver ceramic material which has components thereof which are heat fusable to the glass sheet 10. When the silver ceramic material is heat fused to the glass sheet, the conductive silver of the grid pattern permits electrical current to flow therethrough thereby to heat the glass sheet and cause a defogging and/or deicing thereof in a manner well known to the skilled artisan. Since the construction and application of the electrical grid pattern 14 to the glass sheet 10 is well known in the art, no further discussion thereof will be undertaken herein.

When a glass sheet 10 has the opaque band 12 and electrical grid pattern 14 placed thereon, it is passed through a heating lehr operated at a temperature sufficiently high to heat the opaque band and electrical grid pattern to their fusion temperatures at which the necessary fusion will take place in order to produce a fully bonded opaque band and an electrically conductive pattern on the glass sheet. As the glass sheet passes through the heating lehr, the electric grid pattern 14 is fused to the glass sheet in a manner well known to the art. Also during this movement of the glass sheet through the lehr, the opaque band 12 is heated to a temperature to decompose the radiation curable material and to heat fuse the filler material with the glass sheet thereby forming the opaque band in a tightly adherent manner on the surface of the glass sheet.

Other steps would still be necessary to complete the entire EHB. For example, electrical leads would have to be bonded to the electrical grid pattern 14 on the glass sheet 10 before it could be used as an EHB. However, this additional processing is well known in the art and therefore will not be discussed further herein.

While a particular embodiment of the method of this invention has been illustrated and described, it will be obvious to those skilled in the art that various changes and modifications may be made without departing from the invention and it is intended to cover in the appended claims all such modifications and equivalents as fall within the true spirit and scope of this invention.

I claim:

1. A process for the manufacture of glass sheets used as windows, including the steps of:
    (a) selecting a glass sheet;
    (b) applying an opaque band to a surface of said glass sheet, said opaque band being formed from a radiation curable paste which includes both a filler material which can fuse to said surface of said glass sheet when heated to a fusion temperature and a radiation curable material which is heat decomposable into components which are nonreactive with said glass sheet when heated to said fusion temperature;
    (c) curing said radiation curable material thereby to form a temporary bonding of said radiation curable paste to said surface of said glass sheet; and
    (d) passing said glass sheet through a heating lehr which is operated at a temperature sufficiently high to heat said glass sheet to said fusion temperature whereby said fusable material of said radiation curable paste is fused to said surface of said glass sheet and whereby said radiation curable material is heat decomposed into components which are nonreactive with said surface of said glass sheet.

2. The process of claim 1, in which said radiation curable material is curable by the application of ultraviolet radiation and said radiation curable material is cured by passing it under an ultraviolet light source.

3. The process of claim 1, in which said radiation curable material is curable by the application of electron beam energy and said radiation curable material is cured by passing it under an electron beam gun which applies electron beam energy thereto.

4. A process for the manufacture of electrically heated backlites (EHB's), including the steps of:
    (a) selecting a glass sheet;
    (b) applying an opaque band to a surface of said glass sheet, said opaque band being formed from a radiation curable paste which includes both a filler material which can fuse to said surface of said glass sheet when heated to a fusion temperature and a radiation curable material which is heat decomposable into components which are nonreactive with said glass sheet when heated to said fusion temperature;

(c) curing said radiation curable material thereby to form a temporary bonding of said radiation curable paste to said surface of said glass sheet;

(d) depositing a pattern of electrically conductive material on said surface of said glass sheet, said pattern of electrically conductive material containing at least one component which is heat fusable with said surface of said glass sheet when said glass sheet is heated to said fusion temperature; and (e) passing said glass sheet through a heating lehr which is operated at a temperature sufficiently high to heat said glass sheet to said fusion temperature whereby said fusable materials are fused to said surface of said glass sheet and whereby said radiation curable material is heat decomposed into components which are nonreactive with said surface of said glass sheet.

5. The process of claim 4, in which said radiation curable material is curable by the application of ultraviolet radiation and said radiation curable material is cured by passing it under an ultraviolet light source.

6. The process of claim 4, in which said radiation curable material is curable by the application of electron beam energy and said radiation curable material is cured by passing it under an electron beam gun which applies electron beam energy thereto.

7. A process for the manufacture of electrically heated backlites (EHB's), including the steps of:

(a) selecting a glass sheet;

(b) depositing a pattern of electrically conductive material on said surface of said glass sheet, said pattern of electrically conductive material containing at least one component which is heat fusable with said surface of said glass sheet when said glass sheet is heated to a fusion temperature;

(c) applying an opaque band to a surface of said glass sheet, said opaque band being formed from a radiation curable paste which includes both a filler material which can fuse to said surface of said glass sheet when heated to said fusion temperature and a radiation curable material which is heat decomposable into components which are nonreactive with said glass sheet when heated to said fusion temperature;

(d) curing said radiation curable material thereby to form a temporary bonding of said radiation curable paste to said surface of said glass sheet; and (e) passing said glass sheet through a heating lehr which is operated at a temperature sufficiently high to heat said glass sheet to said fusion temperature whereby said fusable materials are fused to said surface of said glass sheet and whereby said radiation curable material is heat decomposed into components which are nonreactive with said surface of said glass sheet.

8. The process of claim 7, in which said radiation curable material is curable by the application of ultraviolet radiation and said radiation curable material is cured by passing it under an ultraviolet light source.

9. The process of claim 7, in which said radiation curable material is curable by the application of electron beam energy and said radiation curable material is cured by passing it under an electron beam gun which applies electron beam energy thereto.

* * * * *